(12) United States Patent
Kirby et al.

(10) Patent No.: US 11,913,914 B2
(45) Date of Patent: Feb. 27, 2024

(54) APPARATUS AND METHODS FOR MATERIAL TESTING CONFIGURED TO APPLY A RELEASABLE CLAMPING FORCE TO SECURE A CROSSHEAD

(71) Applicant: Illinois Tool Works Inc., Glenview, IL (US)

(72) Inventors: Andrew Kirby, High Wycombe (GB); Audrey Briodeau-Line, Shinfield (GB); Edward Dempsey, Guildford (GB); Graham Mead, Oxford (GB)

(73) Assignee: Illinois Tool Works Inc., Glenview, IL (US)

( * ) Notice: Subject to any disclaimer, the term of this patent is extended or adjusted under 35 U.S.C. 154(b) by 146 days.

(21) Appl. No.: 17/482,110

(22) Filed: Sep. 22, 2021

(65) Prior Publication Data
US 2022/0091001 A1 Mar. 24, 2022

(30) Foreign Application Priority Data
Sep. 24, 2020 (GB) .................................... 2015114

(51) Int. Cl.
- *G01N 3/22* (2006.01)
- *G01N 3/06* (2006.01)
- *G01N 3/04* (2006.01)
- *G01N 3/08* (2006.01)
- *G01N 3/00* (2006.01)

(52) U.S. Cl.
CPC .............. *G01N 3/22* (2013.01); *G01N 3/062* (2013.01)

(58) Field of Classification Search
CPC ...... G01N 3/48; G01N 3/52; G01N 2033/008; G01N 3/06; G01N 3/08; G01N 2203/0202; G01N 2203/0016; G01N 3/56; G01N 2203/0635; G01N 3/02; G01N 2203/003; G01N 2203/04
See application file for complete search history.

(56) References Cited

U.S. PATENT DOCUMENTS

| | | | |
|---|---|---|---|
| 9,726,657 B2 * | 8/2017 | Saleem | G01N 3/08 |
| 2013/0055823 A1 * | 3/2013 | Kawano | G01N 3/08 73/805 |
| 2020/0173893 A1 * | 6/2020 | Peterson | G01N 19/00 |

FOREIGN PATENT DOCUMENTS

| | | |
|---|---|---|
| JP | H11160212 A | 6/1999 |
| JP | 2013057611 A | 3/2013 |

OTHER PUBLICATIONS

Search Report for GB2015114.8, dated Feb. 17, 2021 (3 pages).

* cited by examiner

*Primary Examiner* — Brandi N Hopkins
(74) *Attorney, Agent, or Firm* — McAndrews, Held & Malloy, Ltd.

(57) ABSTRACT

An example material testing apparatus includes: guide means; sample holding means for holding a sample; force means for applying force to the sample; a crosshead arranged to support at least a portion of one or both of the sample holding means and the force means, wherein the crosshead is moveable about the guide means; automated clamping means configured to apply a releasable clamping force between the guide means and the crosshead to secure the crosshead at a location with respect to the guide means, and a controller configured to control the automated clamping means to apply the clamping force between the guide means and the crosshead.

8 Claims, 5 Drawing Sheets

APPARATUS AND METHODS FOR MATERIAL TESTING CONFIGURED TO APPLY A RELEASABLE CLAMPING FORCE TO SECURE A CROSSHEAD

RELATED APPLICATIONS

The present application claims the benefit of United Kingdom (GB) Patent Application No. 2015114.8, filed Sep. 24, 2020, entitled "APPARATUS AND METHOD FOR MATERIAL TESTING." The entirety of United Kingdom (GB) Patent Application No. 2015114.8 is expressly incorporated herein by reference.

FIELD OF THE DISCLOSURE

This invention relates to a material testing machine and more particularly to an apparatus and method for operating a material testing machine.

BACKGROUND

Material testing machines (also sometimes known as structural tests machines) are used to test the physical characteristics of a material sample. Material testing machines use a sample holder to hold the material sample. The location of the sample holder is controlled using a crosshead which clamps to a guide. It is important that the clamping of the crosshead to the guide is able to withstand a large amount of force because the sample will exert some force on the machine in response to the force exerted on the material sample during testing. Existing technologies use manual clamping controlled by a handle operated by a user to secure the crosshead to the guide.

However, as testing machines are developed that are capable of applying larger forces to samples, the length of the handles must increase to enable secure clamping to withstand the larger force. As a result, the handles may become too long which makes the clamping operation unwieldy.

In addition, existing technologies require that the location of the crosshead on the guide is set by a user and that the crosshead is clamped to the guide as two separate operations. As a result, setting up the material testing machine can be time consuming and complex.

It is an object of the present invention to mitigate at least some of the above problems.

BRIEF SUMMARY OF THE DISCLOSURE

In accordance with the present invention, there is provided a material testing apparatus, comprising: guide means; sample holding means for holding a sample; force means for applying force to the sample; a crosshead arranged to support at least a portion of one or both of the sample holding means and the force means, wherein the crosshead is moveable about the guide means; automated clamping means configured to apply a releasable clamping force between the guide means and the crosshead to secure the crosshead at a location with respect to the guide means, and a controller configured to control the automated clamping means to apply the clamping force between the guide means and the crosshead.

Optionally, the automated clamping means may comprise at least one clamping member arranged to contact the guide means, wherein the clamping force is a friction force between the at least one clamping member and the guide means, and optionally the at least one clamping member may be formed of resiliently deformable material.

In some embodiments, at least one of: at least a portion of the at least one clamping member may be arranged to extend from the crosshead to act as a lever for applying the friction force between the at least one clamping member and the guide means; and the automated clamping means may comprise a linear actuator configured to apply a linear force generally perpendicular to an axis of the at least one clamping member for applying the clamping force.

Optionally, the linear force from the linear actuator may be translated into a torque force about a pivot point of the lever, such that the friction force applied is in dependence on the linear force.

In some embodiments, the linear actuator may comprise an electric motor and a gearbox arranged to produce linear motion to apply the linear force. Optionally, the apparatus may comprise an opening between the at least a portion of the at least one clamping member and the crosshead to allow the lever to move in dependence on the linear force to apply the torque force.

In some embodiments, the automated clamping means may be at least one of: supported upon the crosshead; and arranged to maintain the clamping force in an absence of electrical power provided to the automated clamping means.

Optionally, at least one of: the controller may be configured to automatically move the crosshead with respect to the guide means and control the automated clamping means to apply the clamping force to the guide means in a single operation; and the guide means may comprise two guide members each arranged a respective side of the crosshead and the apparatus may comprise first and second clamping members positioned at respective sides of the crosshead to apply the releasable clamping force.

Optionally, the at least one clamping member is at least partially formed as a unitary component with the crosshead.

In some embodiments, there is provided a method of operating a material testing apparatus, wherein the material testing apparatus comprises: guide means, sample holding means for holding a sample, force means for applying force to the sample, a crosshead arranged to support at least a portion of one or both of the sample holding means and the force means, wherein the crosshead is moveable about the guide means, and automated clamping means; and wherein the method comprises: applying a releasable clamping force, using the automated clamping means, between the guide means and the crosshead to secure the crosshead at a location with respect to the guide means; and controlling the automated clamping means to apply the clamping force between the guide means and the crosshead.

Optionally, the method may comprise one or both of: at least one clamping member of the automated clamping means contacting the guide means, wherein the clamping force is a friction force between the at least one clamping member and the guide means; and maintaining the clamping force in an absence of electrical power provided to the automated clamping means.

In some embodiments, the method may comprise applying the friction force using at least a portion of the at least one clamping member arranged to extend from the crosshead to act as a lever.

Optionally, the method may comprise applying a linear force generally perpendicular to an axis of the at least one clamping member for applying the clamping force using a linear actuator.

In some embodiments, the method may comprise translating the linear force into a torque force about a pivot point of the lever, such that the friction force applied is in dependence on the linear force.

According to an embodiment of the present invention, there is provided computer software which, when executed, is arranged to perform any method above.

BRIEF DESCRIPTION OF THE DRAWINGS

Embodiments of the invention are further described hereinafter with reference to the accompanying drawings, in which.

DETAILED DESCRIPTION

Throughout this application, references to "sample" are intended to refer to a specimen, such as a material specimen for testing. The specimen may be a piece of material which is placed into a material testing machine to be tested. The material testing machine may exert a force on the specimen to the test various physical properties of the material of the specimen. The specimen may be, for example, taken from a production process of the material as a sample of the material being produced.

Figure 1:
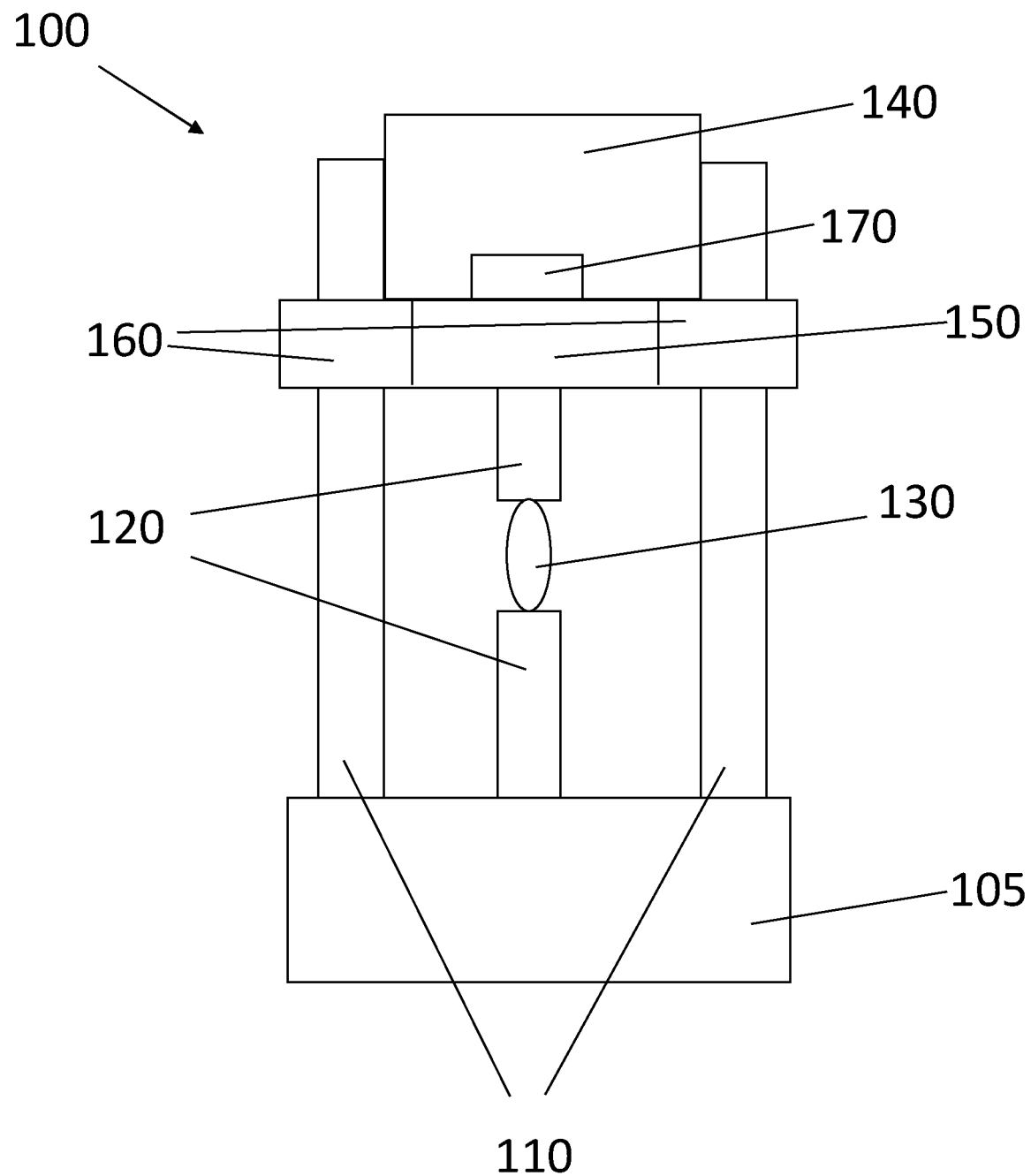
FIG. 1 is an apparatus according to an embodiment of the present invention.

FIG. 1 illustrates a material testing apparatus according to an embodiment of the present invention, indicated generally by reference numeral 100. The material testing apparatus 100 may be configured to perform a method according to an embodiment of the invention as described below in relation to FIG. 5. The material testing apparatus comprises guide means 110, a sample holding device 120, a force apparatus 140, a crosshead 150 and automated clamping means 160.

The guide means 110 may be a guide arranged to support the crosshead 150 and guide a movement of the crosshead 150 about the guide 110. The crosshead 150 is secured about the guide 110 using the automated clamping means 160. The guide 110 may be supported by a base 105 of the material testing apparatus 100. In the embodiment illustrated in FIG. 1, the guide 110 comprises two stanchions, laterally separated by less than a width of the crosshead 150 which extend vertically from the base 105. It will be appreciated that the guide 110 may be adapted according to force requirements and/or a shape and size of the material testing apparatus 100. For example, the guide 110 may comprise one stanchion. Each guide in the illustrated embodiment has a generally circular lateral cross-section although it will be appreciated that other cross-sectional shapes of the guide means may be envisaged.

The crosshead 150 is moveable about the guide 110. The crosshead 150 may be moveable about the guide 110 via translational movement. The movement of the crosshead 150 about the guide 110 may be referred to as a crosshead lift operation, in that the crosshead 150 is lifted to allow the sample 130 to be inserted or removed from the material testing apparatus 100 and to accommodate samples of different sizes to be tested. The movement of the crosshead 150 about the guide 110 enables a position of the sample holding device 130 to be adjusted in dependence on the size of the sample 130. In the embodiment in FIG. 1, the crosshead 150 is arranged to move along the two stanchions of the guide 110 using translational movement. The crosshead 150 is arranged to move in first and second opposed directions about the guide 110 which may be up and down directions along the guide 110. However, it will be appreciated that other configurations of the crosshead and guide will be envisaged. For example, the guide 110 may be arranged horizontally and the crosshead 150 may move left and right about the guide 110.

The crosshead 150 is arranged to support at least a portion of one or both of the sample holding device 130 and the force apparatus 140. Advantageously, using the crosshead 150 as a support for other components of the material testing apparatus 100 results in a compact apparatus.

In the embodiment illustrated in FIG. 1, the force apparatus 140 is supported by the crosshead 150 in that the force apparatus 140 is located on the crosshead 150. Furthermore, an upper part of the sample holding device 120 is supported by the crosshead 150 in that the upper part is suspended below the crosshead 150. The crosshead 150 may be adapted according to force requirements and/or a shape and size of the material testing apparatus 100.

The automated clamping means 160 may be an automated clamping apparatus. The automated clamping apparatus 160 is configured to apply a releasable clamping force between the guide 110 and the crosshead 150 to secure the crosshead 150 at a location with respect to the guide 110. As will be understood by the term "automated", the automated clamping apparatus 160 is configured to automatically apply the releasable clamping force to the guide 110. That is, the automated clamping apparatus 160 secures the crosshead 150 to the guide 110 without manual application of the clamping force. Advantageously, an automated clamping apparatus enables a large clamping force to be applied to secure the crosshead 150 to the guide 110 without using a long handle which would be required if the clamping force was applied in dependence on a user operation. Therefore, the clamping of the crosshead 150 to the guide 110 is able to withstand a large amount of force caused by the force apparatus and/or sample 130 exerting force on the crosshead 150 during testing.

In some embodiments, the automated clamping apparatus 160 may be arranged to maintain the clamping force in an absence of electrical power provided to the automated clamping apparatus 160. As a result, the crosshead 150 is secured to the guide 110 in an absence of electrical power provided to the automated clamping apparatus 160. Advantageously, the automated clamping apparatus 160 is 'failsafe', meaning that the clamping means does not rely on a continuous supply of electrical power to maintain a clamped state. The automated clamping apparatus 160 will be described in more detail in relation to FIGS. 3 and 4.

The material testing apparatus 100 comprises sample holding means 120 and force means 140. The sample holding means 120 is for holding a sample 130 to be tested. The sample holding means 120 may be the sample holding device 120 arranged to grip the sample 130 and may be comprised of a plurality of members, such that the sample 130 is gripped when placed between members of the sample holding device 120. For example, the sample holding device 120 may comprise a plurality of grips, such as claws, each arranged at opposing ends of the sample 130. In some embodiments, there is a pair of grips.

The sample holding device 120 may be configured to withstand a maximum force to be applied to the sample by the material testing apparatus 100. As such, the sample holding device 120 may be structured and formed of a material such that the sample holding device 120 is not deformed by a force less than or equal to the maximum force to be applied to the sample 130. The sample holding device 120 may therefore be adapted according to force requirements and/or a shape and size of the sample 130 to be tested. The sampling holding means 120 may be arranged horizontally or vertically in dependence on a type and amount of force to be applied to the sample. However, it will be appreciated that other structures and forms of sample holding device will be envisaged.

The force means 140 may be the force apparatus 140 for applying force to the sample 130 to test physical properties of the sample 130. The force apparatus 140 may repeatedly apply force to the sample. For example, the force apparatus 140 may apply a deformation or testing force to the deform the sample 130, by one or more of stretching, compression or torsion could be applied instead of or in addition to the deformation force. The force apparatus 140 may apply the force via the sample holding device 130 in that a force to be applied to the sample 130 is applied by moving the sample holding device 130. The force apparatus 140 may be arranged to apply the force to one end of the sample 130 or two opposing ends of the sample 130. The force apparatus 140 may be adapted according to force requirements and/or a shape and size of the material testing apparatus 100. For example, the force apparatus 140 may comprise an actuator. The actuator may be arranged to, in use, move at least one of the sample holding device to apply force to the sample held therein. However, it will be appreciated that other force apparatus to apply a force will be envisaged.

Figure 2:
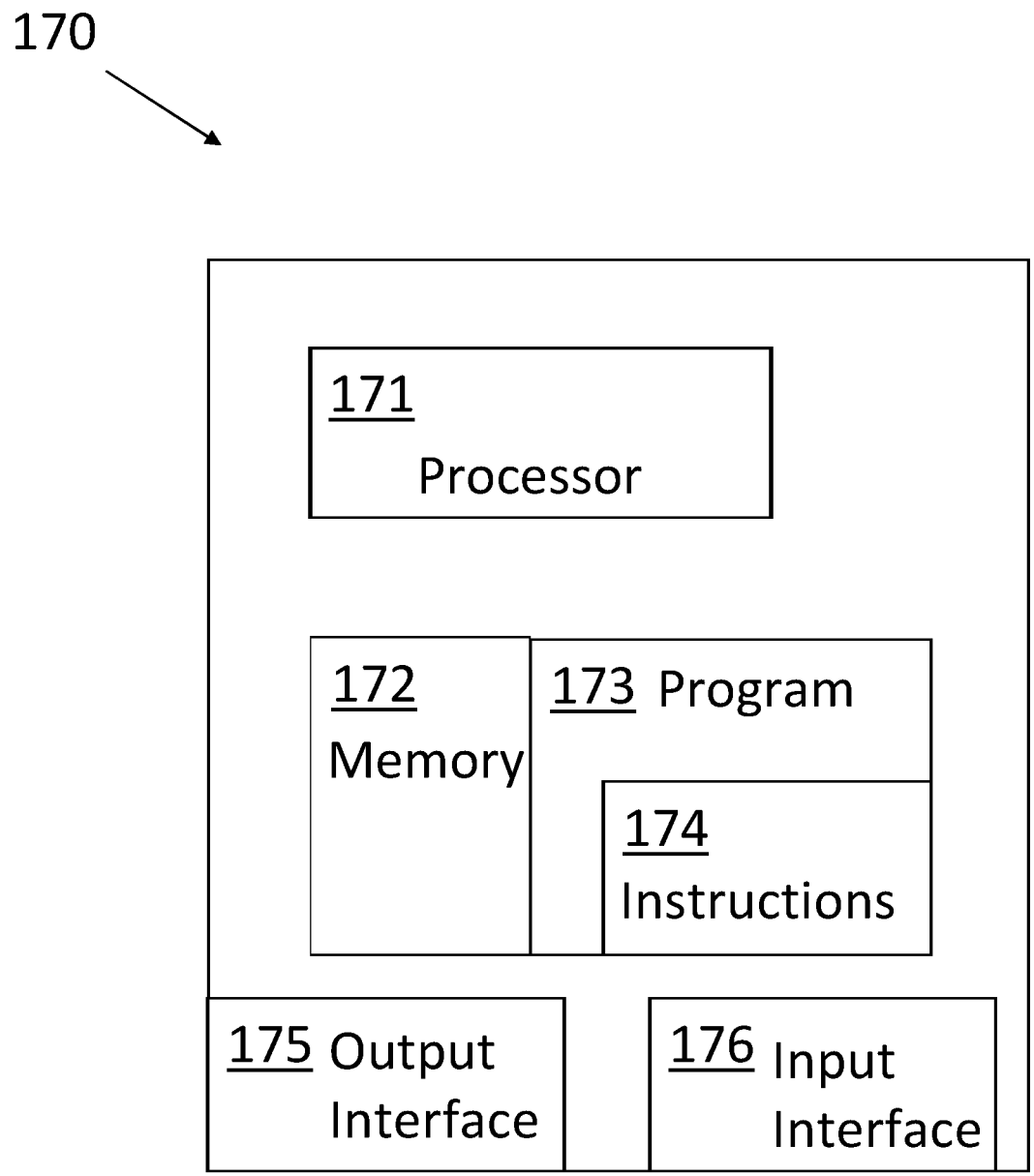
FIG. 2 illustrates a controller according to an embodiment of the present invention.

The materials testing apparatus 110 also comprises a controller 170, such as the controller 170 illustrated in FIG. 2. The controller 170 is configured to control the automated clamping apparatus 160 to apply the clamping force between the guide 110 and the crosshead 150. In this way, the automated clamping apparatus 160 is configured to automatically apply the releasable clamping force between the guide 110 and the crosshead 150 without manual application of the clamping force.

In some embodiments, the controller 170 may be configured to automatically move the crosshead 150 with respect to the guide 110 and control the automated clamping apparatus 160 to apply the clamping force between the guide 110 and the crosshead 150 in a single operation. The single operation may be a set-up operation which causes the application of the releasable clamping force and the crosshead lift operation to be linked. The set-up operation may be controlled by a single user input, via an input device (not illustrated), to initiate the operation to automatically release the clamping force, move the crosshead 150 about the guide 110 and apply the clamping force between the guide 110 and the crosshead 150. Advantageously, the time taken to set up the material testing apparatus for testing the sample is reduced and the process is simplified for the user.

The controller 170 may automatically determine how much clamping force is required to secure the crosshead 150 to the guide 110. For example, the controller 170 may access a stored value to set the clamping force. Alternatively, or in addition, the clamping force may be set by a user using the input device (not illustrated).

The controller 170 may be implemented by a processor 171 and a memory 172 including a computer program 173 comprising computer program instructions 174. The processor 171 may also comprise an output interface 175 via which data and/or commands are output by the processor and an input interface 176 via which data and/or commands are input to the processor. Implementation of the controller 170 can be in hardware alone (a circuit), have certain aspects in software including firmware alone or can be a combination of hardware and software (including firmware). The computer program 173 may be stored on a computer readable storage medium (disk, memory etc). The computer program 173 may be computer software which, when executed, is arranged to perform a method according to the method described below in relation to FIG. 5.

Figure 3:
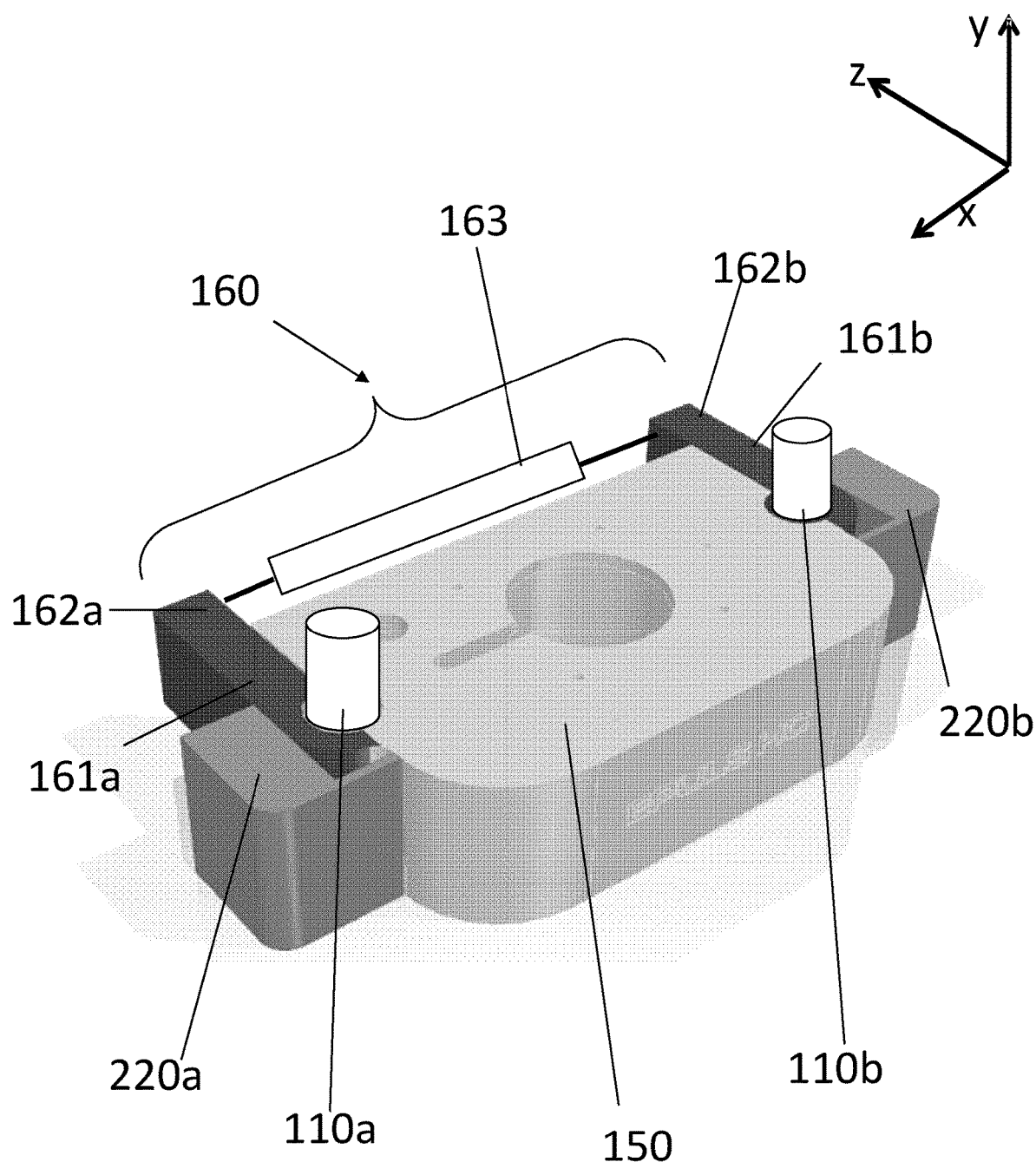
FIG. 3 illustrates automated clamping means according to an embodiment of the present invention.

FIG. 3, which illustrates the crosshead 150 and automated clamping apparatus 160 according to an embodiment of the present invention, will now be described. The automated clamping apparatus 160 may be supported upon the crosshead 150. As shown in FIG. 3, the automated clamping apparatus 160 is supported upon the crosshead 150 in that it is located upon side surfaces of the crosshead 150. The automated clamping apparatus 160 may be supported upon the crosshead 150 using a fastener such as a screw or a bolt. In other embodiments, the automated clamping apparatus 160 may be supported upon the crosshead 150 in that it is suspended from a lower surface of the crosshead 150 or an upper surface of the crosshead 150. The automated clamping apparatus 160 may be partially mounted within the crosshead 150 to allow for a secure affixing of the automated clamping apparatus 160 and the crosshead 150.

The automated clamping apparatus 160 may comprise at least one clamping member 161a, 161b. The at least one clamping member 161a, 161b may be arranged to apply the releasable clamping force. The at least one clamping member 161a, 161b may be at least partially moveable. Advantageously, the at least one clamping member may be sensitive, such that a small movement of the at least one clamping member causes a change to the clamping force.

The at least one clamping member 161a, 161b may be arranged to contact the guide 110. In the embodiment in FIG. 3, the guide 110 comprises guide members 110a, 110b. The at least one clamping member 161a, 161b may be formed such that when it is attached to the crosshead 150, a cavity is formed. The cavity may be arranged to house the guide members 110a, 110b and sized such that the at least one clamping member 161a, 161b and guide members 110a, 110b contact one another respectively. In FIG. 3, the guide members 110a, 110b may extend in the 'y' direction shown by the axes such that they are longer in length in the 'y' direction than depicted in FIG. 3.

As a result of the contact between the at least one clamping member 161a, 161b and the guide 110, the clamping force may be a friction force between the at least one clamping member 161a, 161b and the guide 110. The friction force may be increased as a contact surface area between the at least one clamping member 161a, 161b and the guide 110 increases.

In some embodiments, the at least one clamping member 161a, 161b may be formed of resiliently deformable material, such as a metallic material, for example a metallic alloy. Each of the at least one clamping member 161a, 161b may be further secured to the crosshead 150 using a side block 220a, 220b.

Advantageously, the side block 220a, 220b is arranged such that the at least one clamping member 161a, 161b is encased at an enclosed end. The enclosed end may be an end at which the at least one clamping member 161a, 161b is attached to the crosshead 150. The at least one clamping member 161a, 161b may be attached to the crosshead 150 using a fastener such as a screw or bolt. However, it will be appreciated that other forms and arrangement of attachment of the at least one clamping member to the crosshead will be envisaged.

In the embodiment illustrated in FIG. 3, the guide 110 comprises two guide members 110a, 110b each arranged a respective side of the crosshead 150. The automated clamping apparatus 160 comprises first 161a and second 161b clamping members positioned at respective sides of the crosshead 150 to apply the releasable clamping force. However, it will be appreciated that the guide may comprise any number of guide members each arranged about the crosshead and the automated clamping apparatus may comprise any number of clamping members positioned at respective sides of the crosshead.

The at least one clamping member 161a, 161b may comprise at least a portion 162a, 162b arranged to extend from the crosshead 150, which may be considered as clamping 'ears'. The at least a portion 162a, 162b of the at least one clamping member 161a, 161b may act as a lever for applying the friction force between the at least one clamping member 161a, 161b and the guide 110. The at least a portion 162a, 162b of the at least one clamping member 161a, 161b may be arranged to receive a force which causes the at least one clamping member 161a, 161b to move.

In FIG. 3, the at least a portion 162a, 162b of the at least one clamping member 161a, 161b is arranged to extend from the crosshead 150 perpendicular to a direction of extension of the guide 110. For example, as shown in by axes in FIG. 3, the at least a portion 162a, 162b arranged to extend from the crosshead 150 extends from the crosshead 150 in the 'z' direction and the guide 110 extends in the 'y' direction. It will be appreciated that other orientations of the at least one clamping member with respect to the guide may be envisaged.

Advantageously, with at least a portion of the at least one clamping member extending from the crosshead, there is an increase in clamping efficiency. This means that the force applied to the lever (i.e. the at least a portion of the at least one clamping member extending from the crosshead) is efficiently converted into a clamping force on the guide. In addition, manufacturing a crosshead arranged to attach to a clamping member with this shape is simple.

In FIG. 3, the at least one clamping member 161a, 16b is depicted as being formed of one piece. However, it will be appreciated that other structures of the at least one clamping member 161a, 16b may be envisaged. For example, in other embodiments, the at least one clamping member 161a, 161b may be formed of more than one piece. The at least a portion 162a, 162b of the at least one clamping member 161a, 161b may be a separate component to the remaining part of the at least one clamping member 161a, 161b. The at least a portion 162a, 162b of the at least one clamping member 161a, 161b and the remaining part of the at least one clamping member 161a, 161b may be attached during assembly to form the at least one clamping member 161a, 161b.

The automated clamping apparatus 160 may comprise a linear actuator 163 which is described in more detail below in relation to FIG. 4.

Figure 4:
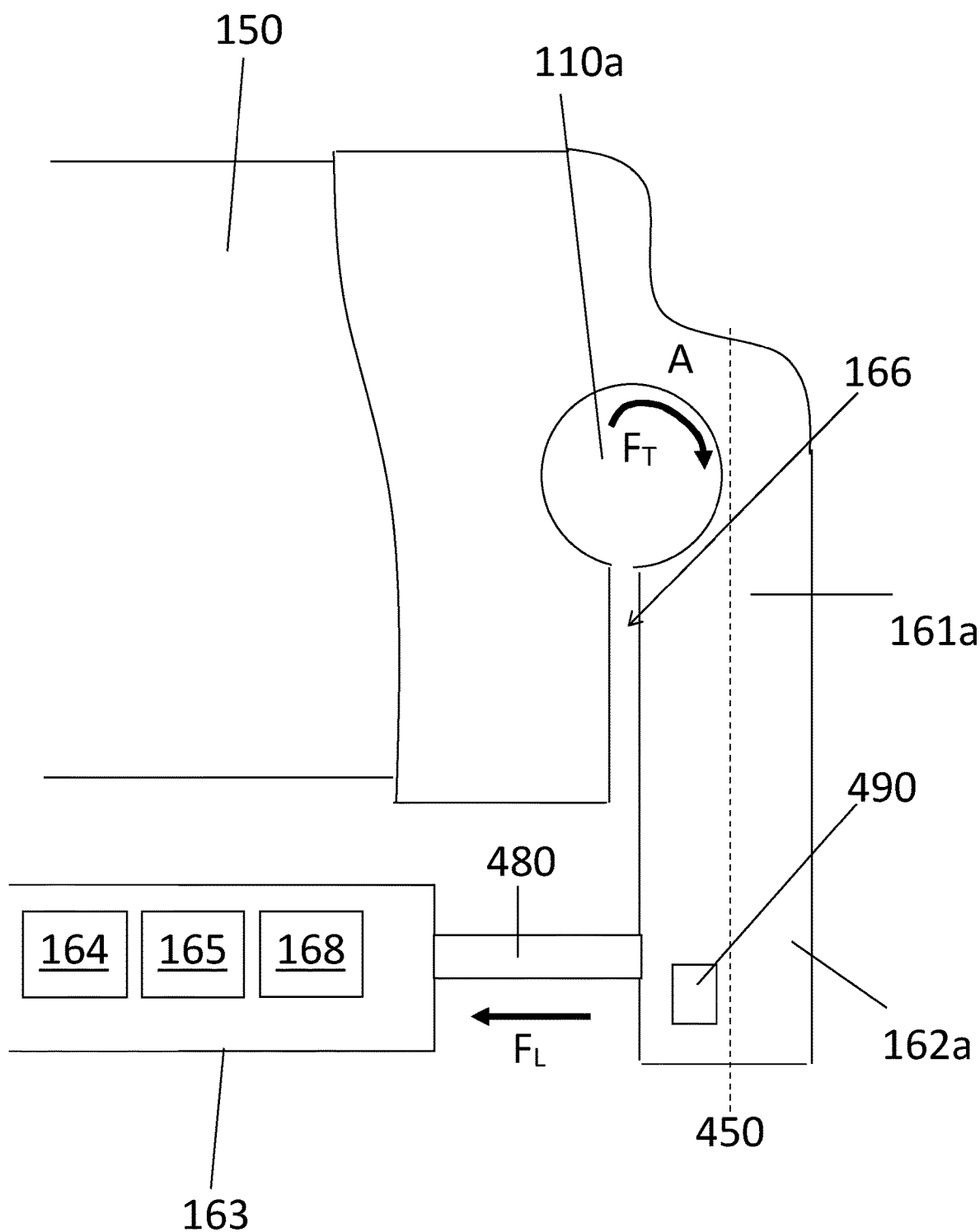
FIG. 4 illustrates a plan view of a portion of the automated clamping means according to an embodiment of the present invention.

FIG. 4 illustrates a plan view of a portion of the automated clamping apparatus 160 according to an embodiment of the present invention (not to scale). Although only one side of the automated clamping apparatus 160 has been illustrated, it will be appreciated that the following description may apply to both sides of the automated clamping apparatus 160.

The linear actuator 163 may be configured to apply a linear force $F_L$ generally perpendicular to an axis 450 of the at least one clamping member 161a for applying the clamping force. In particular, the linear actuator 163 may be arranged to apply the linear force $F_L$ to the at least a portion 162a of the at least one clamping member 161a arranged to extend from the crosshead 150, i.e. the clamping 'ears'. In this way, the linear force $F_L$ causes the at least one clamping member 161a to move.

In FIG. 4, the axis 450 is parallel to the direction of extension of the at least a portion 162a of the at least one clamping member 161a arranged to extend from the crosshead 150. Advantageously, the linear actuator may be housed in a space formed by the at least a portion 162a, 162b of the at least one clamping member extending from the crosshead, and a rear surface of the crosshead 150 from which the at least a portion 162a, 162b of the at least one clamping member extends, thereby maintaining a compact design for the machine testing apparatus. In addition, the linear actuator may be easily compatible with the at least one clamping member and the crosshead.

The linear force $F_L$ from the linear actuator 163 may be translated into a torque force $F_T$ about a pivot point (indicated in the approximate area by label 'A') of the lever 162a, such that the friction force applied is in dependence on the linear force $F_L$. As the linear actuator 163 applies a linear force $F_L$ to pull the at least a portion 162a, 162b of the at least one clamping member 161a towards the crosshead 150, the torque force $F_T$ is applied. Therefore, the torque force $F_T$ is applied in dependence on the linear force $F_L$.

Since the at least one clamping member 161a contacts the guide member 110a, the torque force $F_T$ acts to alter the contact between the at least one clamping member 161a and the guide member 110a, thereby altering the friction force such that friction force applied is in dependence on the linear force $F_L$. Advantageously, such an arrangement is compact and allows a large clamping force to be achieved without using a long handle for manual control by a user.

The linear actuator 163 may comprise an electric motor 164 and a gearbox 165. The electric motor 164 and the gearbox 165 may be arranged to produce linear motion to apply the linear force $F_L$. The linear actuator 163 may comprise a ball screw unit 168 comprising a ball screw mechanism to convert rotation motion of the electric motor 164 into the linear motion which is used to apply the linear force $F_L$. The linear actuator 163 may be self-locking to prevent uncontrolled release of the clamping force. Although the ball screw unit 168 has been used as an example, it will be appreciated that other mechanical arrangements may be used in the linear actuator 163.

The linear actuator 163 may be attached to the at least a portion 162a of the at least one clamping member 161a using an intermediary member 480, such as a tie rod. The intermediary member may be arranged to transfer the linear force $F_L$ from the linear actuator 163 to the at least a portion 162a of the at least one clamping member 161a.

The automated clamping apparatus 160 may comprise an opening 166 between the at least a portion 162a of the at least one clamping member 161a and the crosshead 150. The opening 166 may allow the lever 162a (i.e. the at least a portion of the at least one clamping member) to move in dependence on the linear force $F_L$ to apply the torque force $F_T$. The opening 166 provides space for the at least a portion 162a of the at least one clamping member 161a to move into as a result of the linear force $F_L$ applied by the linear actuator 163. Advantageously, this allows for efficient conversion of the linear force into torque force.

It will be appreciated that the automated clamping apparatus 160 may also comprise an opening 166 between the at least a portion 162*b* of the at least one clamping member 161*b* and the crosshead 150 (not illustrated in FIG. 4).

In some embodiments, the at least one clamping member 161*a*, 161*b* may at least partially be formed as a unitary component with the crosshead 150. For example, all of the at least one clamping member except for the at least a portion 162*a*, 162*b* of the at least one clamping member 161*a*, 161*b* arranged to extend from the crosshead 150 (i.e. the clamping 'ears') may be formed as the unitary component with the crosshead 150. Advantageously, the partially unitary component is quicker and easier to manufacture and install into the machine testing apparatus 100.

A sensor 490 may be housed with the at least one clamping member 161*a*, 161*b* to sense the clamping force to be applied. The sensor 490 may provide an input to the processor 171.

Figure 5:
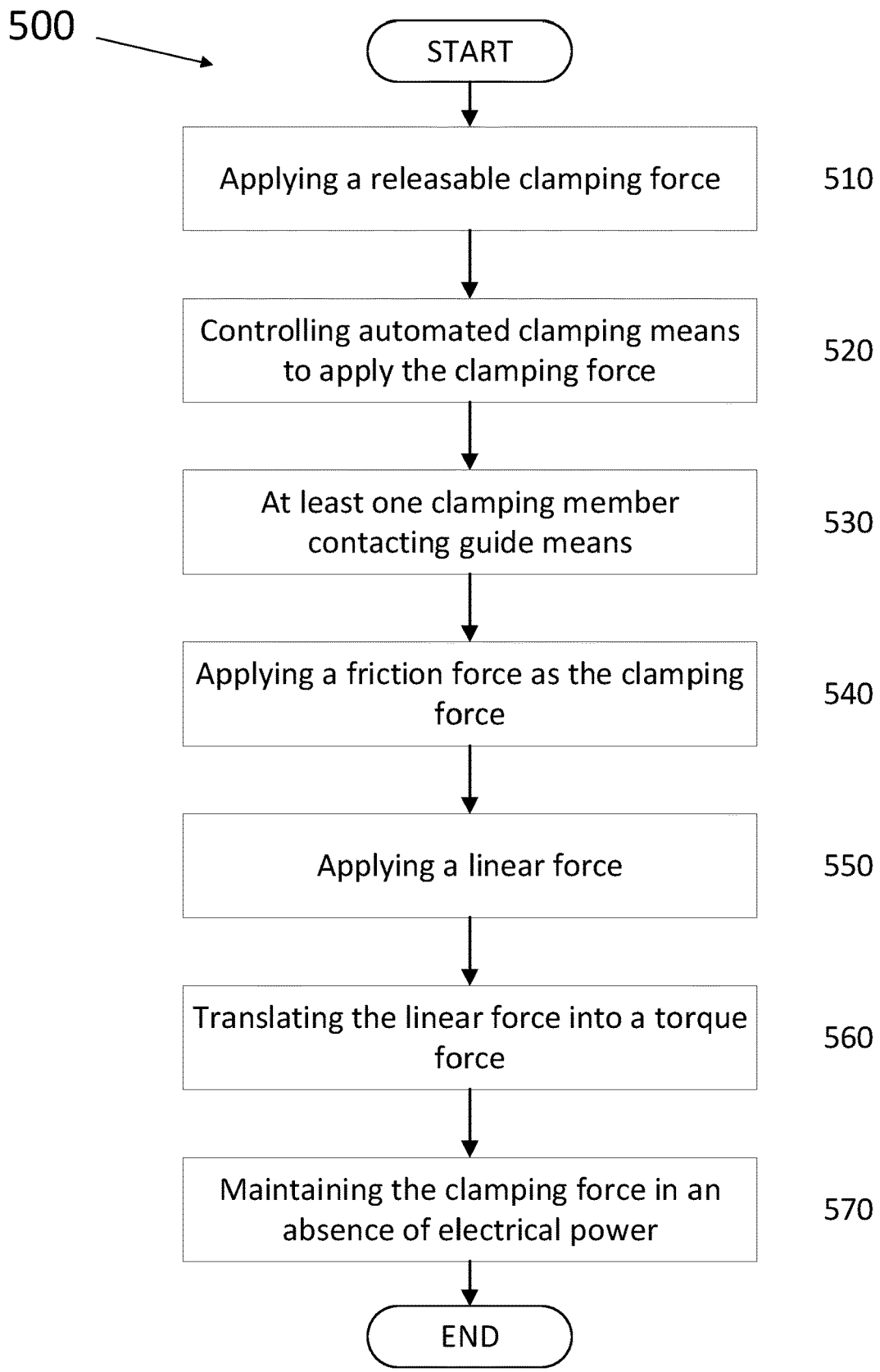
FIG. 5 illustrates a flowchart of a method according to an embodiment of the present invention.

FIG. 5 illustrates a flowchart of a method 500 according to an embodiment of the invention. The method 500 may be performed by the material testing apparatus 100 described above and illustrated in FIGS. 1-4.

The method 500 comprises applying 510 a releasable clamping force. The releasable clamping force is applied between the guide 110 and the crosshead 150, using the automated clamping apparatus 160, to secure the crosshead 150 at a location with respect to the guide 110.

Method step 520 comprises controlling the automated clamping apparatus 160 to apply the clamping force between the guide 110 and the crosshead 150. As discussed above the term "automated" means that the method comprises automatically applying the releasable clamping force between the guide 110 and the crosshead 150. That is, the method step 520 involves securing the crosshead 150 to the guide 110 without user intervention. A user may initiate application of the clamping force.

The method 500 may comprise at least one clamping member 161*a*, 161*b* of the automated clamping apparatus 160 contacting 630 the guide 110. The clamping force may be a friction force between the at least one clamping member 161*a*, 161*b* and the guide 110.

The method 600 may comprise applying 540 the friction force. The friction force may be applied using at least a portion 162*a*, 162*b* of the at least one clamping member arranged to extend from the crosshead 150 to act as a lever. In this way, the method involves applying the friction force as a result of contact between the at least one clamping member 161*a*, 161*b* and the guide 110 to apply the clamping force.

In some embodiments, the method 500 may comprise applying 550 a linear force generally perpendicular to an axis 450 of the at least one clamping member 161*a*, 16*b* for applying the clamping force using a linear actuator 163.

The method 500 may comprise translating 560 the linear force $F_L$ into a torque force $F_T$ about a pivot point of the lever 162*a*, 162*b*. As such, the friction force applied is in dependence on the linear force $F_L$. The method step 560 is achieved by the structure of the at least a portion 162*a*, 162*b* of the at least one clamping member 161*a*, 161*b* with respect to the crosshead 150 and the guide 110 as discussed above.

The method 500 may comprise maintaining 570 the clamping force in an absence of electrical power provided to the automated clamping apparatus 160. Therefore, the method allows for failsafe operation in which the clamping force is maintained even if power to the apparatus is lost, for example in the event of a power cut.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A material testing apparatus, comprising:
   guide means;
   sample holding means for holding a sample;
   force means for applying force to the sample;
   a crosshead arranged to support at least a portion of one or both of the sample holding means and the force means, wherein the crosshead is moveable about the guide means;
   automated clamping means configured to apply a releasable clamping force between the guide means and the crosshead to secure the crosshead at a location with respect to the guide means, wherein the automated clamping means comprises:
   at least one clamping member arranged to contact the guide means, wherein the clamping force is a friction force between the at least one clamping member and the guide means, and at least a portion of the at least one clamping member is arranged to extend from the crosshead to act as a lever for applying the friction force between the at least one clamping member and the guide means; and a linear actuator configured to apply a linear force ($F_L$) generally perpendicular to an axis of the at least one clamping member for applying the clamping force, wherein the linear force ($F_L$) from the linear actuator is translated into a torque force ($F_T$) about a pivot point of the lever, such that the friction force applied is in dependence on the linear force ($F_L$); and a controller configured to control the automated clamping means to apply the clamping force between the guide means and the crosshead.

2. The apparatus of claim 1, wherein the at least one clamping member is formed of resiliently deformable material.

3. The apparatus of claim 1, wherein the linear actuator comprises an electric motor and a gearbox arranged to produce linear motion to apply the linear force ($F_L$).

4. The apparatus of claim 1, comprising an opening between the at least a portion of the at least one clamping member and the crosshead to allow the lever to move in dependence on the linear force ($F_L$) to apply the torque force ($F_T$).

5. The apparatus of claim 1, wherein the automated clamping means is at least one of:
supported upon the crosshead; and
arranged to maintain the clamping force in an absence of electrical power provided to the automated clamping means.

6. The apparatus of claim 1, wherein at least one of:
the controller is configured to automatically move the crosshead with respect to the guide means and control the automated clamping means to apply the clamping force to the guide means in a single operation; and
the guide means comprises two guide members each arranged a respective side of the crosshead and the apparatus comprises first and second clamping members positioned at respective sides of the crosshead to apply the releasable clamping force.

7. The apparatus of claim 1, wherein the at least one clamping member is at least partially formed as a unitary component with the crosshead.

8. A method of operating a material testing apparatus, wherein the material testing apparatus comprises:
guide means,
sample holding means for holding a sample,
force means for applying force to the sample,
a crosshead arranged to support at least a portion of one or both of the sample holding means and the force means, wherein the crosshead is moveable about the guide means, and
automated clamping means comprising a linear actuator and at least one clamping member arranged to extend from the crosshead to act as a lever; and
wherein the method comprises:
contacting the guide means by the at least one clamping member;
applying a releasable clamping force using at least a portion of the at least one clamping member between the guide means and the crosshead to secure the crosshead at a location with respect to the guide means, wherein the clamping force is a friction force between the at least one clamping member and the guide means, wherein applying the releasable clamping force comprises:
applying a linear force ($F_L$) generally perpendicular to an axis of the at least one clamping member using a linear actuator; and
translating the linear force ($F_L$) into a torque force ($F_T$) about a pivot point of the lever, such that the friction force applied is in dependent on the linear force ($F_L$); and
controlling the automated clamping means to apply the clamping force between the guide means and the crosshead.

* * * * *